United States Patent
Bonnet

(10) Patent No.: US 6,318,539 B1
(45) Date of Patent: Nov. 20, 2001

(54) CONVEYOR INCLUDING CONTROLLED PACKAGE EJECTION CAPABILITIES

(76) Inventor: Henri Bonnet, 290 Crosstree La., Atlanta, GA (US) 30328

(*) Notice: Subject to any disclaimer, the term of this patent is extended or adjusted under 35 U.S.C. 154(b) by 0 days.

(21) Appl. No.: 09/206,919

(22) Filed: Dec. 7, 1998

Related U.S. Application Data

(62) Division of application No. 08/789,497, filed on Jan. 12, 1997, now Pat. No. 5,868,239.

(51) Int. Cl.⁷ ................................................. B65G 47/10
(52) U.S. Cl. ................................. 198/370.02; 198/370.07
(58) Field of Search ..................... 198/370.01, 370.02, 198/370.03, 370.07, 370.11

(56) References Cited

U.S. PATENT DOCUMENTS

| | | |
|---|---|---|
| 2,286,332 | 6/1942 | Bleyer . |
| 2,293,121 | 8/1942 | Dudley . |
| 2,446,890 | 8/1948 | Stadelman . |
| 2,884,118 | 4/1959 | Williams . |
| 3,026,988 | 3/1962 | Fisk . |
| 3,198,308 | 8/1965 | Driesch et al. . |
| 3,202,266 | 8/1965 | Schmermund . |
| 3,231,068 | 1/1966 | Harrison et al. . |
| 3,262,549 | 7/1966 | Stewart et al. . |
| 3,262,550 | 7/1966 | Kampfer . |
| 3,270,863 | 9/1966 | Ackles . |
| 3,310,161 | 3/1967 | Kraft, Jr. . |
| 3,333,675 | 8/1967 | Lord . |
| 3,348,678 | 10/1967 | Flowers . |
| 3,349,893 | 10/1967 | Jordan et al. . |
| 3,481,807 | 12/1969 | Kanamori . |
| 3,511,357 | 5/1970 | Vanderhoof . |
| 3,682,295 | 8/1972 | Roinestad . |
| 3,756,380 | 9/1973 | Ackroyd et al. . |
| 3,776,349 | 12/1973 | Kampfer . |
| 3,777,877 | 12/1973 | Piper . |
| 3,788,447 | 1/1974 | Stephanoff . |
| 3,838,767 | 10/1974 | Taylor . |
| 3,865,229 | 2/1975 | Velander . |
| 3,889,803 | 6/1975 | White . |
| 3,904,028 | 9/1975 | Muller . |
| 3,944,044 | 3/1976 | Hamy . |
| 3,976,192 | 8/1976 | Muller . |
| 4,024,949 | 5/1977 | Kleysteuber et al. . |
| 4,067,439 | 1/1978 | Janitsch . |
| 4,078,654 | 3/1978 | Sarovich . |
| 4,084,687 | 4/1978 | Lapeyre . |
| 4,128,163 | 12/1978 | Rana et al. . |
| 4,170,281 | 10/1979 | Lapeyre . |
| 4,185,747 | 1/1980 | Blattermann . |
| 4,227,610 | 10/1980 | Gerdes et al. . |

(List continued on next page.)

FOREIGN PATENT DOCUMENTS

| | | |
|---|---|---|
| 352226 | 4/1922 | (DE) . |
| 4033425 | 4/1992 | (DE) . |
| 4443207 | 6/1995 | (DE) . |
| 0 286 080 | 12/1988 | (EP) . |
| 0 391 301 | 10/1990 | (EP) . |
| 2088498 | 1/1972 | (FR) . |
| 1045348 | 10/1966 | (GB) . |
| 2 174 667 | 11/1986 | (GB) . |
| 2-221007 | 9/1990 | (JP) . |
| 3-95009 | 4/1991 | (JP) . |
| 1514708 | 6/1987 | (SU) . |
| 1316954 | 10/1989 | (SU) . |

*Primary Examiner*—James R. Bidwell

(57) ABSTRACT

An automated conveyor sortation and item discharge system for sorting items of varying sizes and weights to designated output destinations along a conveyor. Dual-bellows configurations are provided to provide predetermine package discharge characteristics, including a "self-correcting" feature. A programmable controller may be provided to control the conveyor and the discharge of items from the conveyor by the ejection mechanisms. The system is easy to repair and operates at high speeds at reduced noise levels.

11 Claims, 12 Drawing Sheets

U.S. PATENT DOCUMENTS

| | | |
|---|---|---|
| 4,295,559 | 10/1981 | Neal et al. . |
| 4,369,873 | 1/1983 | Heuft . |
| 4,537,658 | 8/1985 | Albert . |
| 4,637,511 | 1/1987 | Johnson et al. . |
| 4,682,686 | 7/1987 | Ueda et al. . |
| 4,711,341 | 12/1987 | Yu et al. . |
| 4,712,965 | 12/1987 | Canziani . |
| 4,732,260 | 3/1988 | Canziani . |
| 4,770,290 | 9/1988 | Eroskey et al. . |
| 4,776,454 | 10/1988 | Momose . |
| 4,875,573 | 10/1989 | Wiseman . |
| 4,884,676 | 12/1989 | Suizu . |
| 4,930,613 | 6/1990 | Okura et al. . |
| 5,127,510 | 7/1992 | Cotter et al. . |
| 5,176,247 | 1/1993 | Counter et al. . |
| 5,288,194 | 2/1994 | Ueda et al. . |
| 5,388,681 | 2/1995 | Bonnet . |
| 5,421,446 | 6/1995 | Koch et al. . |
| 5,422,165 | 6/1995 | Arnold . |
| 5,433,311 | 7/1995 | Bonnet . |
| 5,456,349 | 10/1995 | Axmann . |
| 5,547,063 | 8/1996 | Bonnet . |
| 5,823,320 | 10/1998 | Seidel et al. . |
| 5,868,239 * | 2/1999 | Bonnet ........................ 198/370.07 X |
| 5,890,584 | 4/1999 | Bonnet . |
| 5,894,918 * | 4/1999 | Bonnet ........................ 198/370.02 X |
| 5,950,798 * | 9/1999 | Bonnet ............................ 198/370.02 |

* cited by examiner

SERPINTINE CONVEYOR LAYOUT

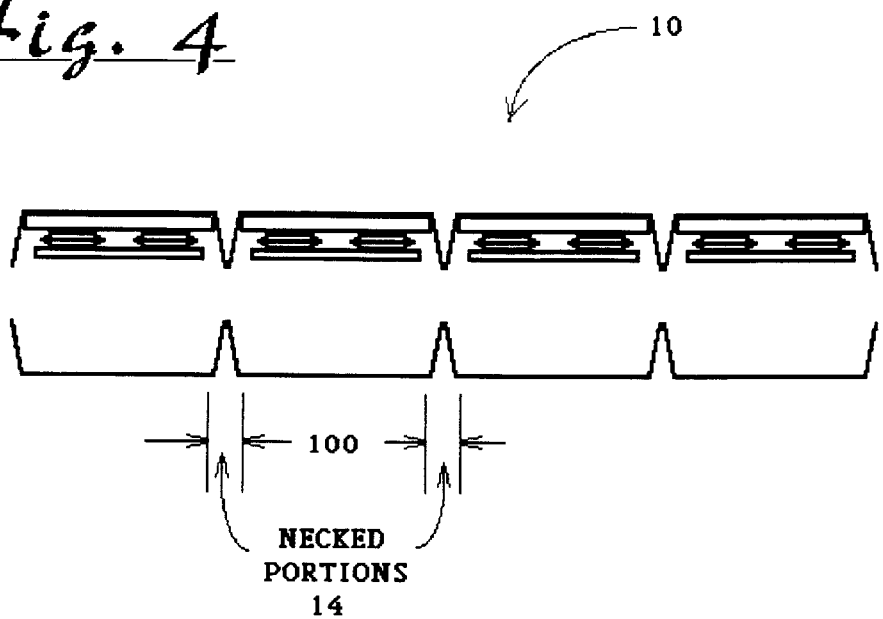
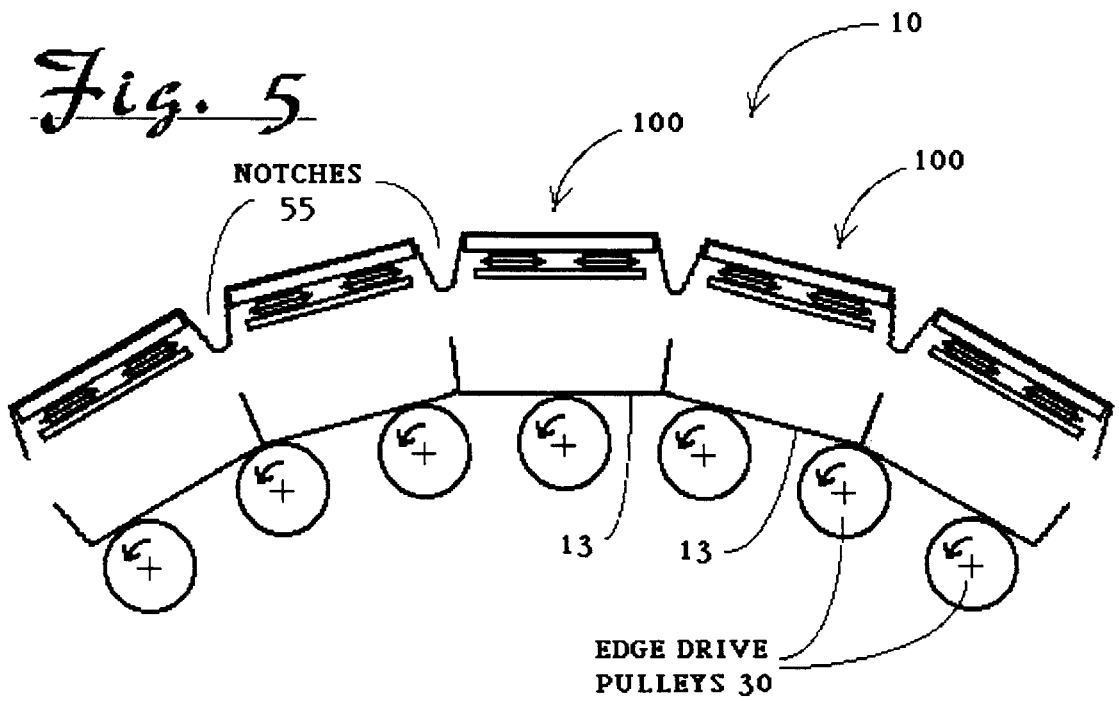

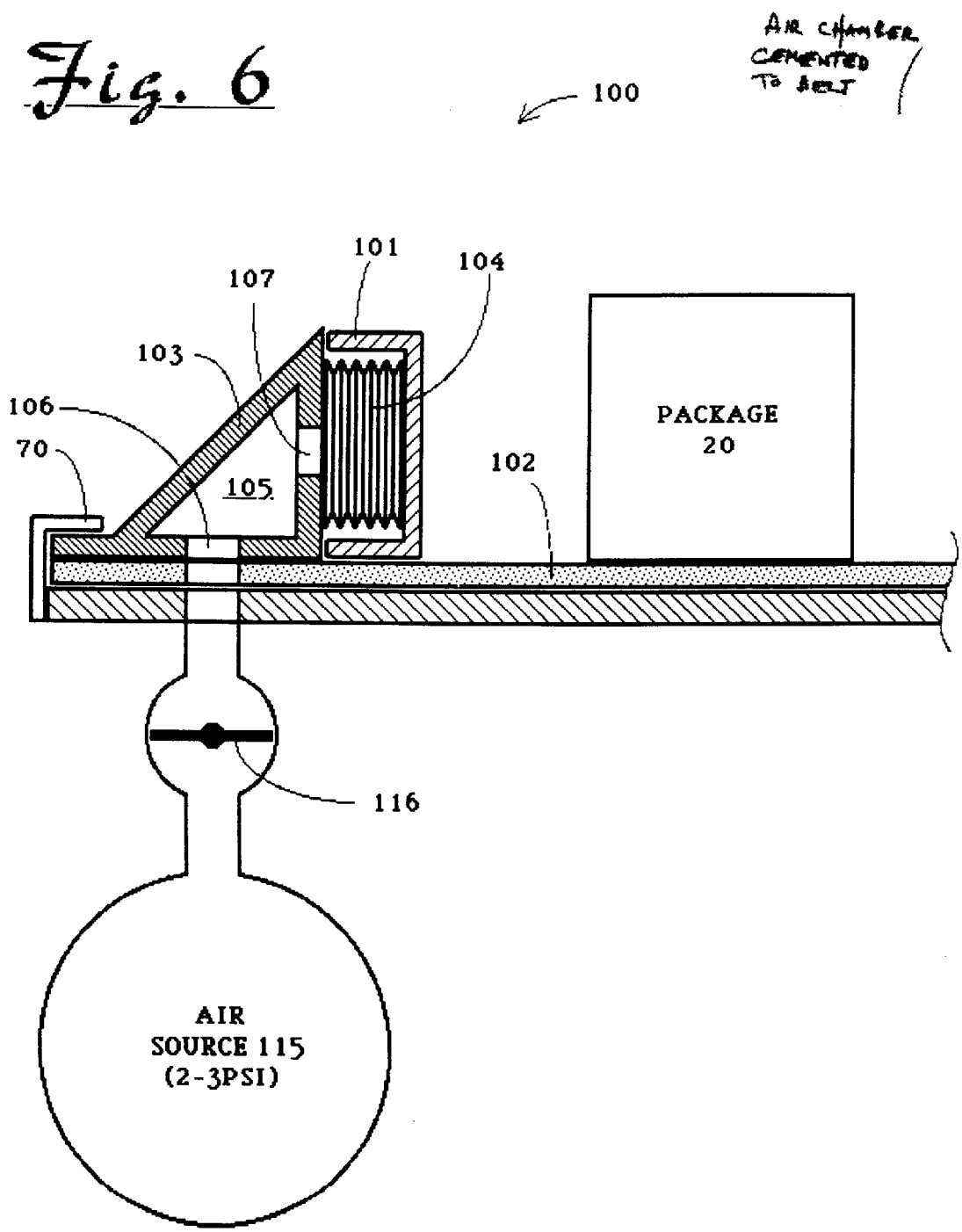

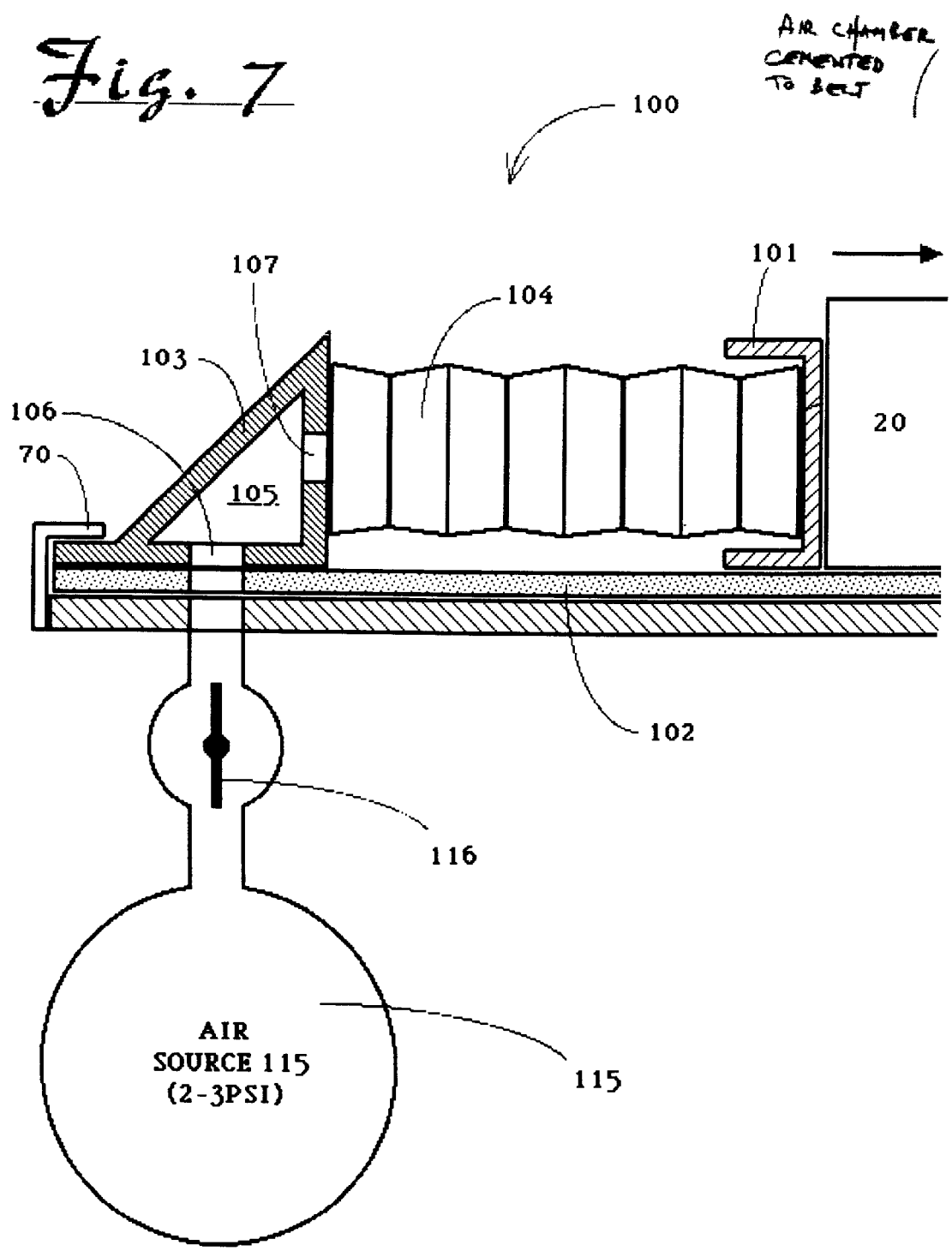

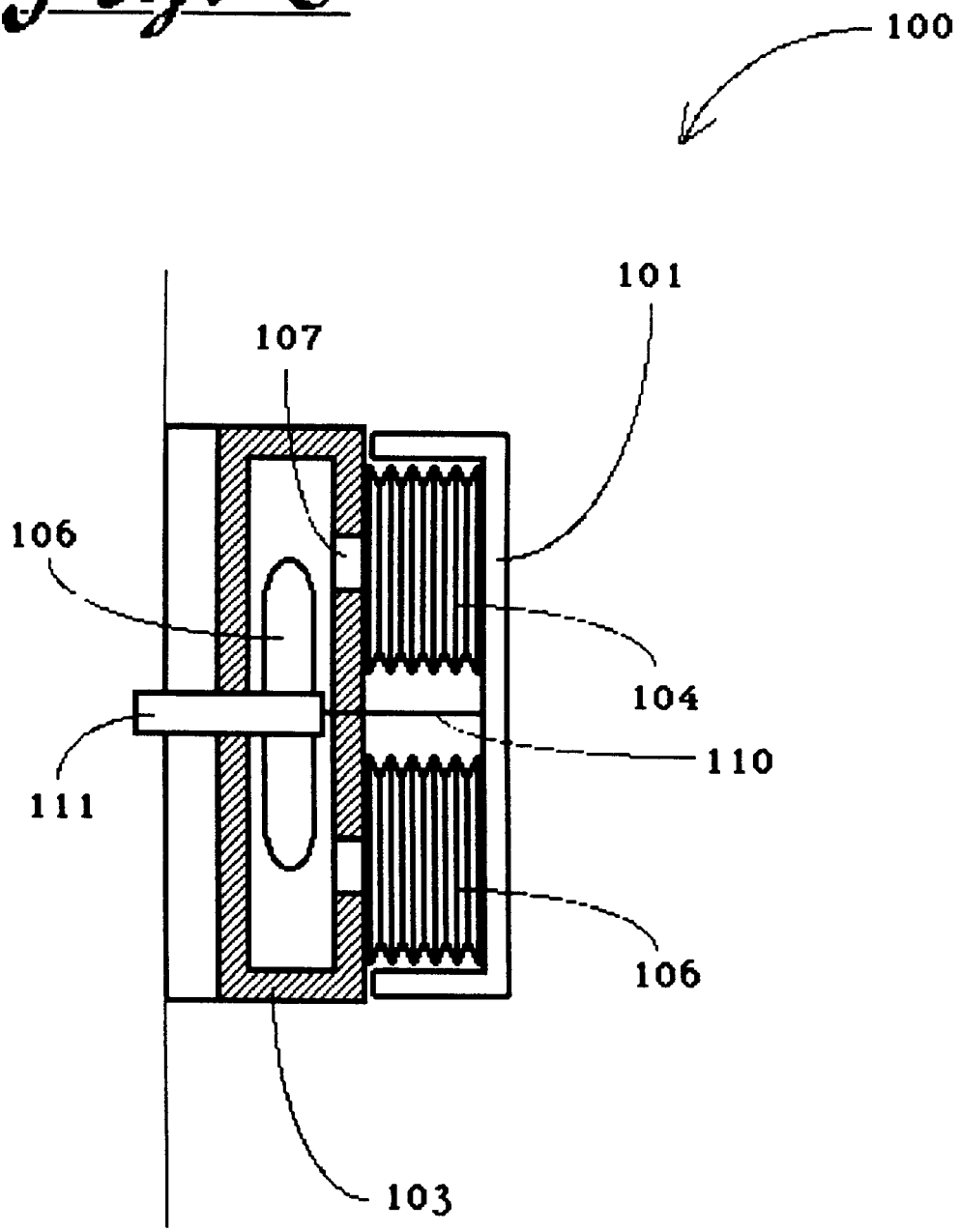

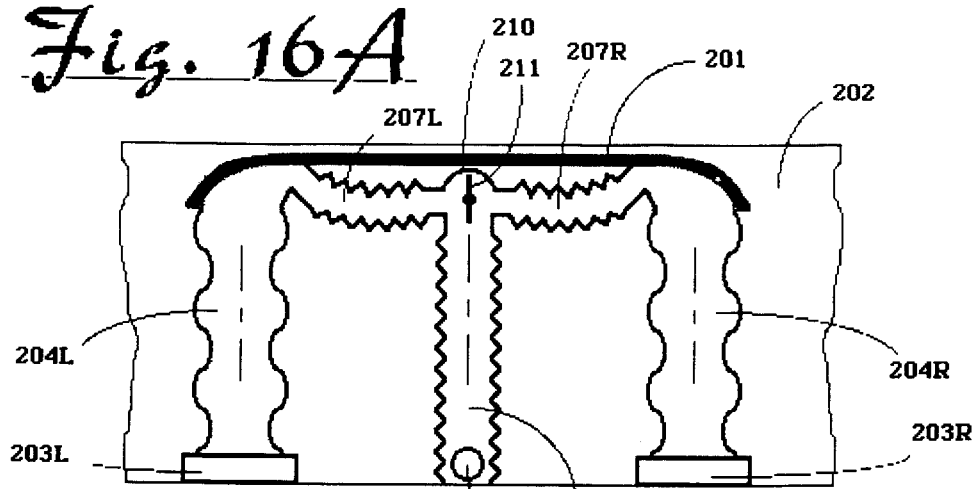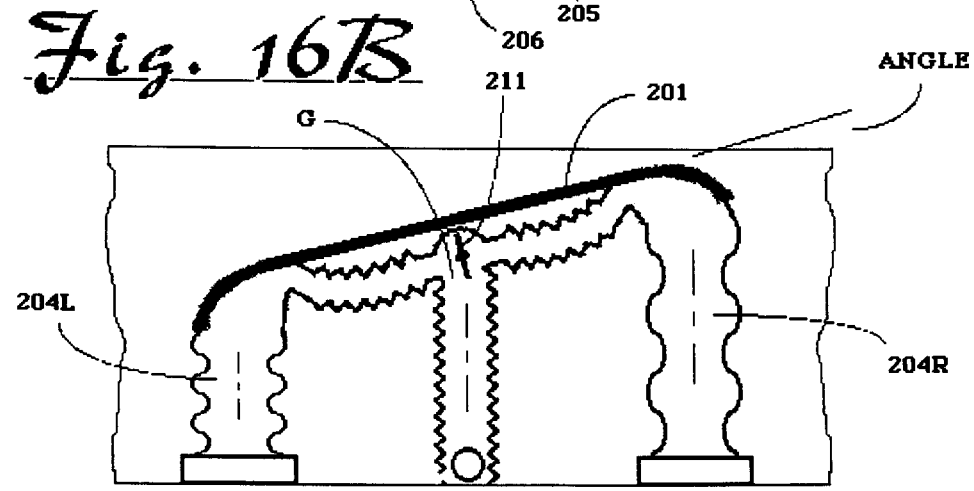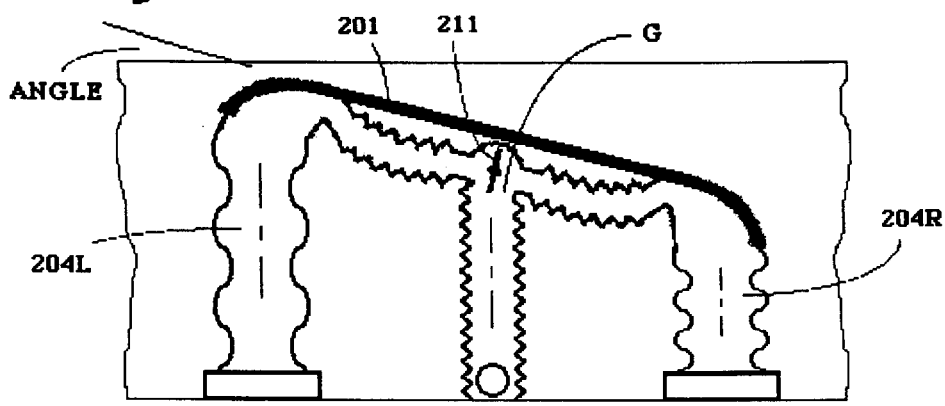

US 6,318,539 B1

CONVEYOR INCLUDING CONTROLLED PACKAGE EJECTION CAPABILITIES

CROSS-REFERENCE TO RELATED APPLICATION

This is a divisional application of U.S. patent application Ser. No. 08/789,497, filed Jan. 12, 1997, issued as U.S. Pat. No. 5,868,239 on Feb. 9, 1997.

TECHNICAL FIELD

This invention relates generally to the automated conveying and sorting of items such as packages from one or more loading sites to a variety of output destinations, and more particularly relates to a conveying system which can convey packages along and eject them from said path in a controlled manner.

BACKGROUND OF THE INVENTION

Modern high volume package delivery systems often include package conveying systems that accept packages from one or more loading stations, and transports the packages to a variety of output destinations such as chutes, bins, and subsequent conveyor systems.

One of the most conventional types of conveyors is a belt conveyor, which includes the use of an endless flexible belt which passes over at least two cylindrical rollers, one of which is a drive roller. Packages are placed atop the upwardly-directed "working" surface of the belt conveyor, and are transported in a generally straight direction from end of the conveyor to the other.

Although such conventional belt conveyors have advantages, including simplicity, they also have disadvantages in that they conventionally only provide a "straight-line" transporting feature. This can be restrictive to package delivery system designers which may have the need to move a package or other product from an origin through a tortuous, curved, path to a destination.

Therefore, it has been known in the prior art to provide flexible conveyor chains such as shown in U.S. Pat. No. 3,776,349 to Kampfer, entitled "Fabricated Conveyor Chain", which discloses the concept of providing a fabricated flexible conveyor chain, which includes a plurality of link units 11 linked together by a plurality of pivot pins 12. Although the pivot pins 12 provide a linking feature between the link units, they fit loosely enough within their mounting holes to allow sideward relative pivoting of the link units. A similar type of "hard pin" connection is disclosed in U.S. Pat. No. 3,262,550 to Kampfer, entitled "Conveyor Chain", in U.S. Pat. No. 2,884,118 to Williams, entitled "Articulator Conveyor Chain", and also in U.S. Pat. No. 5,176,247 to Counter et. al., entitled "Sideflexing Conveyor Chain Including Low Centerline Hinge Pin".

Although such "hard pin" connection configurations as described above have their advantages, they have disadvantages in that they tend to be complex, expensive, noisy, and difficult to maintain. Furthermore, they tend to provide a multitude of hard "pinch points", which are disadvantageous when in a human workplace environment. A "smooth" but flexible conveyor configuration is disclosed in U.S. Pat. No. 4,084,687 to Lapeyre, entitled "Conveyor Having Resilient Conveying Surface", but this configuration appears to be quite complex, requiring the use of link members 10 which are linked to modules 20 to support and convey flexible members 32 supported thereon.

Therefore, a need has been recognized in the art to provide a package conveyor system which can transport packages or other items along a tortuous path, yet is simple in construction, quiet in operation, and cost-effective to manufacture, operate, and maintain.

Other needs in the art have also existed. For example, when packages placed atop conveyors are to be ejected from the conveyor, an efficient, reliable ejection mechanism is needed.

Therefore, a need exists in the art for a method and apparatus for ejecting packages from a conveyor, which is reliable and efficient in operation, yet provides desired package ejection capabilities such as controlled angled discharge and controlled "square" discharge.

SUMMARY OF THE INVENTION

The present invention overcomes deficiencies in the prior art by providing a method and apparatus for ejecting packages from a conveyor which is reliable and efficient, yet provides controlled package discharge capabilities, including controlled square discharge, and controlled "angled discharge".

Generally described, the present invention comprises a conveyor apparatus defining a plurality of supporting surfaces for conveying a plurality of packages placed thereon, the apparatus comprising a frame, a plurality of conveying segments configured for movement along a conveying path relative to the frame, a pusher member for relative movement across a supporting surface of one of the conveying segments for pushing at least one of the packages, and at least two substantially parallel linear force members configured in parallel to attach the pusher member relative to one of the conveying segments, energizement of the linear force members resulting in the pushing of an object on said conveying segment across its supporting surface to be pushed therefrom.

The present invention also provides a conveyor apparatus defining a plurality of supporting surfaces for conveying a plurality of packages placed thereon, the apparatus comprising a frame, a plurality of conveying segments configured for movement along a conveying path relative to the frame, a pusher member for relative movement across a supporting surface of one of the conveying segments for pushing at least one of the packages, and at least two substantially parallel bellows members configured in parallel to attach the pusher member relative to one of the conveying segments, the inflation of the bellows members resulting in the pushing of an object on the conveying segment across its supporting surface to be pushed therefrom.

The present invention also provides a package diversion apparatus for diverting a package atop a conveying surface and to a location adjacent to the travel path of the conveying surface as it is traveling along a conveying axis, the apparatus comprising a conveyor for defining the conveying surface, a pusher member defining a substantially planar pushing portion, and at least two parallel bellows members configured to push the pusher member such that the planar pushing portion is at a substantially predetermined angle relative to the conveying axis as said pusher member discharges the package from the conveying surface.

The present invention also provides a self-correcting package diversion apparatus for diverting a package atop a conveying surface and to a location adjacent to the travel path of the conveying surface traveling as it is along a conveying axis, the apparatus comprising a conveyor for defining the conveying surface, a pusher member defining a substantially planar pushing portion, at least two parallel air bellows members configured to push the pusher member upon the filling of the bellows members with air, and a self-correcting valve means for controlling the flow of air to the bellows members, the valve means configured to supply more air to the bellows which is less extended than the other, such that the substantially planar pushing portion of the pusher member tends to remain substantially parallel to the travel path of the conveying surface.

Thus, it is an object of the present invention to provide an improved automated conveyor sorting system.

It is a further object of the present invention to provide an improved conveyor which may be readily repaired and maintained.

It is a further object of the present invention to provide a conveyor which operates at reduced noise levels.

It is a further object of the present invention to provide an improved ejection mechanism for ejecting items from a conveying surface.

It is a further object of the present invention to provide an ejection mechanism for ejecting items from a conveying surface in a controlled manner.

It is a further object of the present invention to provide a conveyor apparatus which can eject a package in an "angled" orientation.

It is a further object of the present invention to provide a conveyor apparatus which can eject a package in an "square" orientation.

It is a further object of the present invention to provide a conveyor apparatus which includes a "self-correcting" feature.

Other objects, features, and advantages of the present invention will become apparent upon review of the following description of preferred embodiments and the appended drawings and claims.

BRIEF DESCRIPTION OF THE DRAWINGS

FIG. 4 is a top plan view of a straight section of a conveyor system 10 according to the present invention including a plurality of "push plate" package conveying segments 100 and a plurality of necked portions 14.

FIG. 5 is a top plan view of a curved section of a conveyor system according to the present invention including a plurality of push plate package conveying segments 100 illustrating the interaction of the curved section with edge drive pulleys positioned on the "inside" of the curve along which the segments are traveling.

FIG. 6 is a side elevational view of a "push plate" package conveying segment 100, shown in its retracted mode.

FIG. 7 is a side elevational view of the "push plate" package conveying segment 100 of FIG. 6, shown in its extended mode and pushing a package 20.

FIG. 8 is a top elevational view of the "push plate" package conveying segment 100 of FIG. 6 shown in its retracted mode.

FIGS. 16A–16C are all similar top plan view of a alternate, self-correcting, dual bellows configuration, which includes a self-correcting platelike valve 211, which tends to divert more air to the bellows least inflated.

DETAILED DESCRIPTION OF THE PREFERRED EMBODIMENT

Reference is now made in more detail to the drawings, in which like numerals refer to like parts throughout the several views.

General Discussion

Figure 1:
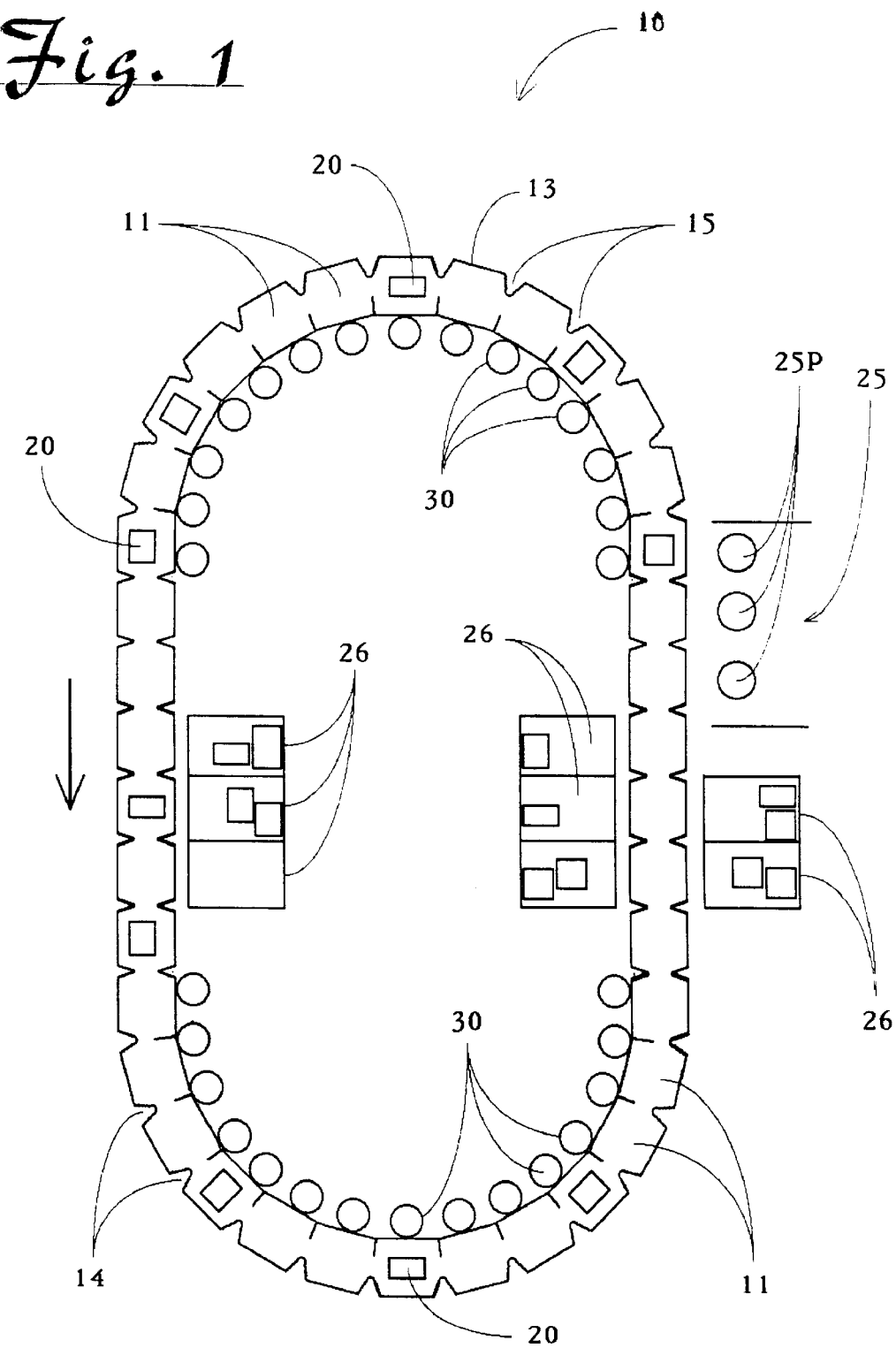
FIG. 1 is a top overhead view of a first layout of an overall conveyor system 10 according to the present invention, which is essentially an endless conveyor having two "semicircle" portions and two straight-line portions.
Figure 2:
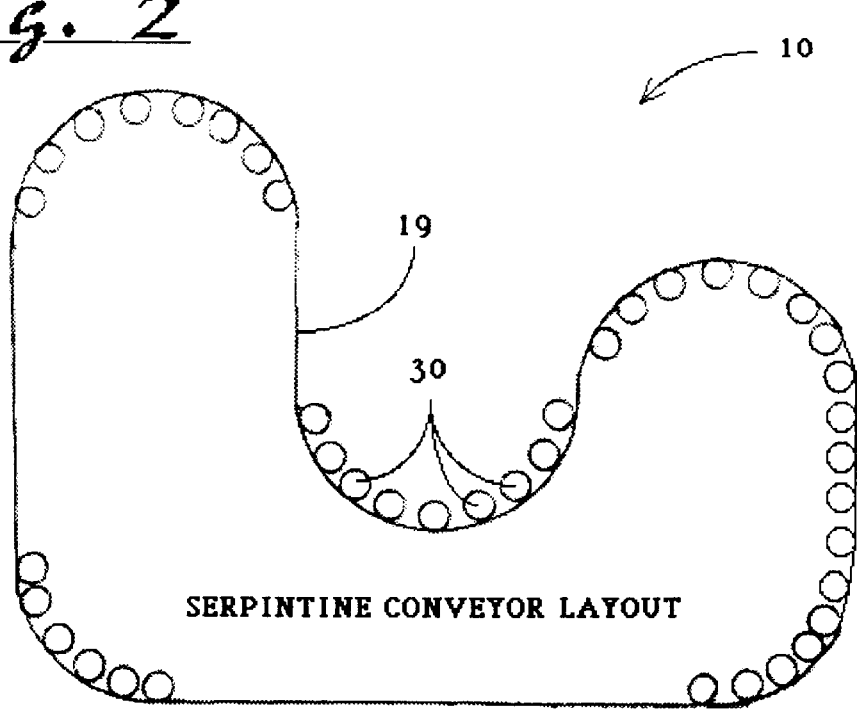
FIG. 2 is a top plan view of a second layout of an overall conveyor system 10 according to the present invention including a serpentine conveying path 19.
Figure 3:
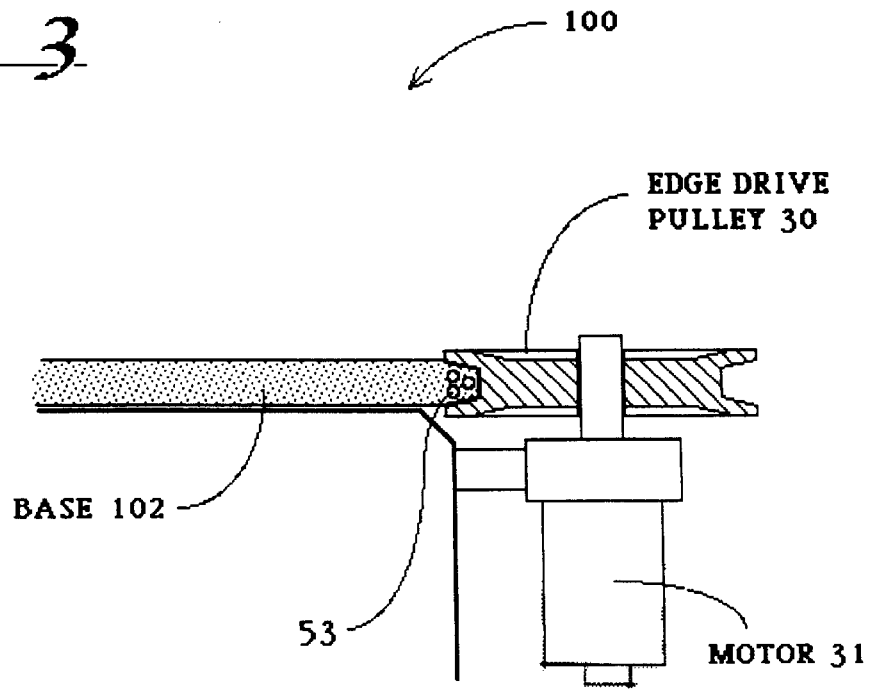
FIG. 3 is a side partial cut away view illustrating the interaction of an edge drive pulley 30 with the reinforced edge 53 of a base 102 of a "push plate" package conveying segment 100.

General operation of the conveyor apparatus 10 according to the present invention is as follows. Referring first to FIG. 1, the conveyor apparatus 10 according to the present invention includes a plurality of conveying segments 11 which are attached together by flexible necked portions 14 (see FIG. 4), which allow the conveying segments 11 to pivot sidewardly relative to each other. This relative pivoting capability allows the conveying segments 11 to be moved along a curved or even serpentine path such as shown as 19 in FIG. 3. The conveying segments 11 are configured to support (either directly or indirectly as discussed in detail below) packages 20 or other items, thus allowing the conveyor system 10 to likewise move the packages along a curved or serpentine path and eject them therefrom.

The package conveying segments generally denoted as 11 of the serpentine conveyor system 10 can take different particular configurations. In the case of FIGS. 4–9 and 11–14, two or more horizontally-acting bellows members are attached relative to the top surface of the base 102 of a "push plate" conveying segment 100, to provide a pushing function by a pusher member (a.k.a. a "push plate" or "pusher plate") to a package situated atop the top surface of the base 102, such that it pushed off the base 102. In the case of FIG. 10, a "split" configuration is used, which can be used for an over/under configuration due to the presence of an additional bending location.

The conveyor system 10 can also include the use of side-urging pulleys 30 (see for example FIGS. 1, 2, 3 and 5) or a belt (not shown), to grip and drive the discrete side edges of the package conveying segments. As these side edges 13 are spaced apart by notches, and if pulleys 30 are used, the position of the pulleys can be on the "inside" of the path curve, where the notches tend to be substantially or completely closed. If a belt is used, it is not as critical that the notches be closed. In fact, the belt can be used on the inside of the path curve, or can also be used along a straight portion of the curve.

It may be well understood that this serpentine capability provides a marked advantage for conveyor system designers, as it does not restrict them to the use of straight conveying paths. It also allows for the use of a "carousel"-type conveying system which can provide a continuous support loop for the support and conveyance of packages, effectively allowing for packages to remain on the conveyor over one or more than one of its process cycles. This is to be distinguished from "over-under" conveying systems in which the conveyor is facing upwardly (and can be used) half the time, but is facing downwardly (and cannot be used) the other half of the time. Typically in such a configuration, drive and idler rollers having substantially horizontal axis are used to support and drive the conveyor.

Figure 15:
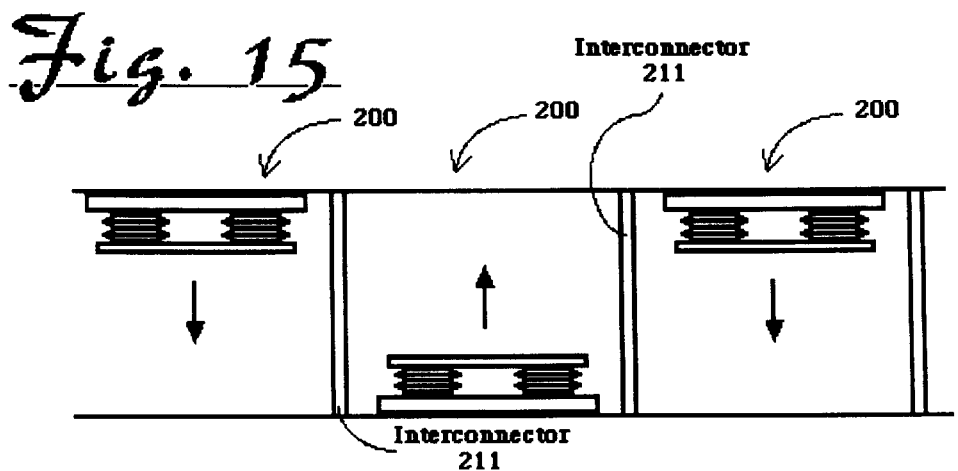
FIG. 15 is a top plan view of a conveyor section including a plurality of push plate package conveying segments attached thereto, such that dual side discharge is provided.

If an over-under design is to be used, substantially rigid platforms interconnected by flexible connectors, such as shown in FIG. 15, can be used.

In order to discharge packages from the top, package supporting, surfaces of the conveyors (be they belt or rigid platform), dual air bellows configurations may be used such as shown in FIGS. 4–13, 15 and 16. These dual bellows configuration can be used to provide desired discharge characteristics, including self-correcting characteristics when used in conjunction with a correcting valve such as particularly shown in FIG. 17.

As shown in FIG. 1, the conveyor apparatus 10 according to the present invention includes a plurality of conveying segments 11 which are attached together by flexible necked portions 14 (see FIG. 4), which allow the conveying segments 11 to pivot sidewardly relative to each other. This relative pivoting capability allows the conveying segments 11 to be moved along an oval-shaped path having curves and straight portions as shown in FIG. 1, and also allows them to move along a serpentine path shown as 19 in FIG. 2. The conveying segments 11 are configured to support (either directly or indirectly as discussed in further detail below) packages 20 or other items, thus allowing the conveyor system 10 to likewise move the packages along a curved or serpentine path. In the preferred embodiment, the conveying segments 11 and the flexible necked portions 14 are all part of the same flexible conveyor belt, although other separate configurations are also contemplated.

As shown in FIG. 1, the path of the package conveying segments can be oval-shaped, and pass along side various destination chutes such as 26. Within a loading station 25, packages may be placed upon the package conveying segments 11, from loading positions 25P. These loading positions 14P can be occupied by human operators hand-placing packages atop the package conveying segments, or could alternately be mechanical means as known in the art.

As shown in FIG. 1, the flexible necked portions allow the package conveying segments 11 to travel along a path which includes straight portions as well as curves, requiring the package conveying segments 11 to pivot sidewardly relatively to each other when making the transition from the curved portion to the straight portion, or vice versa. The notches 15 present in the flexible neck portions 16 provide clearance to facilitate such sideward flexing.

Reference is now also made to FIGS. 4 and 5, which are more detailed similar top plan views of the conveyor according to the present invention, illustrating a particular type of package conveying segment 100 used with the flexible necked portions 14.

FIG. 4 shows a "straight-line" length of the conveyor 10, that is, the shape the conveyor takes when passing along a straight line path. In such a configuration, the notches 15 in the flexible necked portions 14 are effectively the same shape regardless of which side they are on.

FIG. 5 illustrates the shape of the conveyor length as it passes around a curve. As may be seen in FIG. 5, the "inside" notches in the conveyor belt tend to be almost or completely closed, thus accommodating the pivoting action. Similarly, the "outside" notches tend to be more open, with flexing occurring along the flexible necked portion 14.

As may well be understood, the flexible necked portions of the conveyor system can undergo a high degree of stress over their lifetimes, due to the fact that they are being repeatedly flexed while making turn transitions, as well as the fact that their reduced configurations require their narrowest cross section to not only flex but to carry a significant load. Therefore, it has been deemed preferable to include additional reinforcement in the form of KEVLAR or steel reinforcements (not shown).

The Edge Gripping Pulleys(FIGS. 3, 5–7)

As noted above, and referring generally to FIGS. 3, 5–7, the conveyor system 10 can include the use of edge drive pulleys 30, to grip the discrete side edges of the package conveying segments to cause the conveyor to move along its path. As these side edges 13 are spaced apart by notches 15, and if pulleys 30 are used, the position of the pulleys can be on the "inside" of the path curve, where the notches tend to be substantially or completely closed. This is advantageous in that the partial or complete closing of the gaps provided by the notches can provide a substantially or completely continuous edge which is "seen" by the edge drive pulleys 30. In the configuration shown in FIGS. 1 and 5, the notches are completely closed, such that a continuous edge is "seen" by the driving pulleys. In the configuration shown in FIG. 10, the notches are not completely closed.

In one embodiment of the present invention such as shown in FIG. 1, the side edge of the conveying segments 11 are not straight, instead they are slightly "cupped" inwardly such that a semicircle of substantially constant radius is defined by the inner edges of the conveying segments as they go around each half turn. This provides a substantially consistent edge for the pulleys 30 to drive. However, the pulleys 30 can be spring-loaded to accommodate slight variations due to tolerances and wear.

In one preferred embodiment, the notches define a seven degree (7°) angle, the reinforcement strip is approximately 1.5 inches in width, and the lateral spacing of the peaks of the notches is likewise 1.5 inches. The notches are sixteen (16) inches on center and a 20 foot turn radius is accommodated with full closure of the inside notches. The center reinforcement is a conventional steel or KEVLAR reinforced belt.

In the configuration shown in FIG. 1, these edge drive pulleys 30 are located inside the conveying path, along the inside edge of the belt path as shown in FIG. 1. However, in reference to FIG. 2, it may be seen that the edge drive pulleys 30 can also be located outside of the conveyor path, but at the same time being on the inside of a particular conveyor path curve.

In FIG. 7, an edge restraint 70 is provided on the outside of the curved path, in order to laterally restrain movement of the conveying segments as they are urged by the edge pulleys. The package conveying segments are therefore captured between the edge pulleys 30 and the outer restraint 70, and moved therebetween by the force of the edge pulleys 30. However, it may of course be understood that outer edge restraints such as 70 could be used at many different locations along the conveyor belt path, not only to provide the above-referenced capturing feature, but also as shown in FIG. 6 to provide a retaining function which may be needed to counter a sideward force imparted to the belt during a dynamic pushing function discussed later in this application. Finally, edge restraints such as 70 can be used along belt portions that may need some guidance for other reasons. For example, it could be necessary to use two cooperating, inwardly-directed edge restraints 70 to encourage belt alignment at a particular location along its path.

Horizontal Bellows (FIGS. 4–13, 15 and 16)

Another particular type of package conveying segment generally denoted as 11 in FIG. 1 can be a "push plate" conveying segment shown as 100 in, for example, FIGS. 4 and 5. In this embodiment, two or more horizontally-acting bellows members are attached relative to the top surface of the base 102 of the push plate conveying segment 100, to provide a pushing function to a package situated atop the top surface of the base 102, such that it is pushed off the conveying segment base 102.

Referring now particularly to FIG. 6, the configuration 100 includes a base 102, a chamber housing 103, bellows members 104, and a push plate 101. The air chamber housing 103 of the push plate conveying segment 100 is attached to the upper surface of the base 102, and is configured to fit under the edge restraint 70. The air chamber housing 103 defines an interior air chamber 105 which is supplied air through a chamber inlet port 106 and itself supplies air to two chamber outlet ports 107. Each of the two chamber outlet ports 107 supplies air from the chamber 105 to a corresponding one of the two horizontally-oriented members 104. In one preferred embodiment, the base 102 is composed of flexible conveyor belt material.

The bellows members 104 operate such they extend along their lengths upon the introduction or air, such that their two ends are separated along the width of the package conveying segment 100. The bellows members 104 are side-by-side in a parallel relationship, and each has one end attached to the air chamber housing 103 and the other attached to the push plate 101. Upon the energizement of the bellows members 104 from their retracted positions shown in FIGS. 6 and 8 to their extended positions shown in FIGS. 7 and 9, the push plate 101 is itself pushed substantially across the width of the base 102 of the push plate conveying segment 100. Should a package be positioned on the base 102 beside the push plate 101, it is discharged from the base as shown in FIG. 16 by the bellows members 104. Energizement of the bellows member is provided by opening a valve such as 116 from its position shown in FIG. 6 to its position shown in FIG 7.

Figure 9:
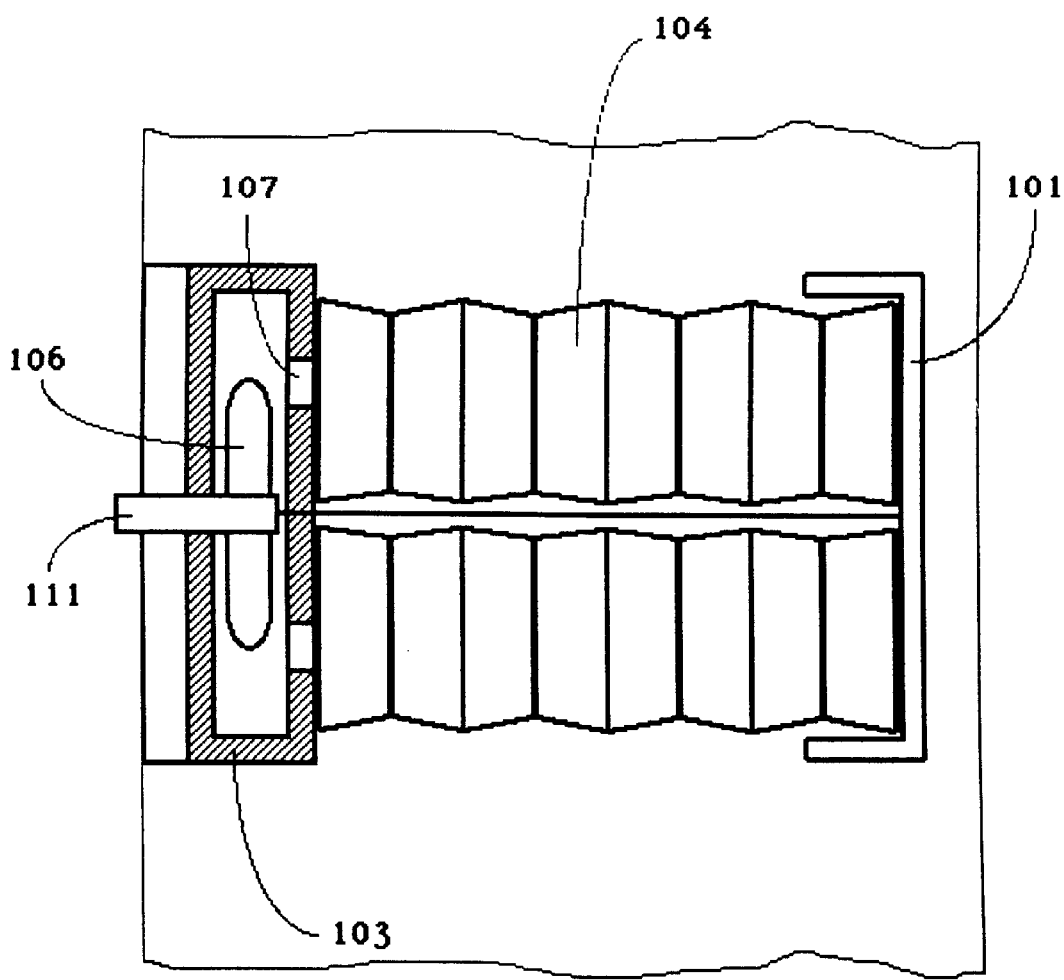
FIG. 9 is a top elevational view of the "push plate" package conveying segment of FIG. 6, shown in its extended mode.
Figure 10:
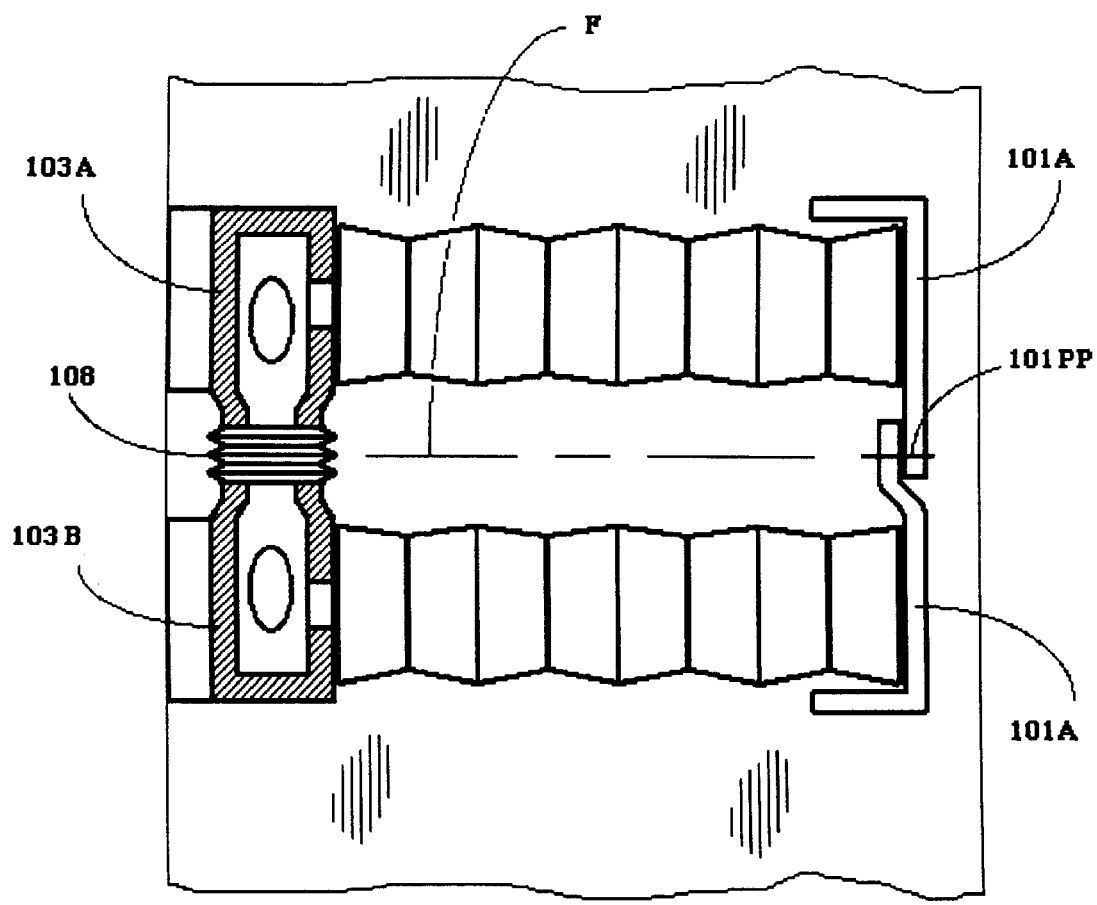
FIG. 10 is an alternate configuration which allows for flexing along flex axis F of a dual bellows configuration including two air chamber housing segments 103A and 103B, connected by a flexible bellows 108. The push plate is also segmented into portions 101A and 101B, pivotably connected via pivot pin 101PP.

As shown in FIGS. 8 and 9 (but omitted for clarity in FIG. 10), the conveying segment 100 includes a retracting cable 110, which is extended and contracted from a retracting cable housing 111. The retracting cable housing 111 is attached relative to the air chamber housing 103, and thus the base 102. The retracting cable 110 is mounted within the retracting cable housing 111, such that a tensile force is imparted on the cable 110 such that a pull is everpresent on the push plate which tends to retract it from its extended position of FIGS. 7 and 9 to its retracted position of FIGS. 6 and 5. The force imparted by the retracting cable 110 is sufficient to retract the bellows only when the bellows are not energized.

FIGS. 6–10 illustrate a "dual" bellows feature. However, it should be understood that one, two, or even more bellows may be used in a particular construction.

Figure 11:
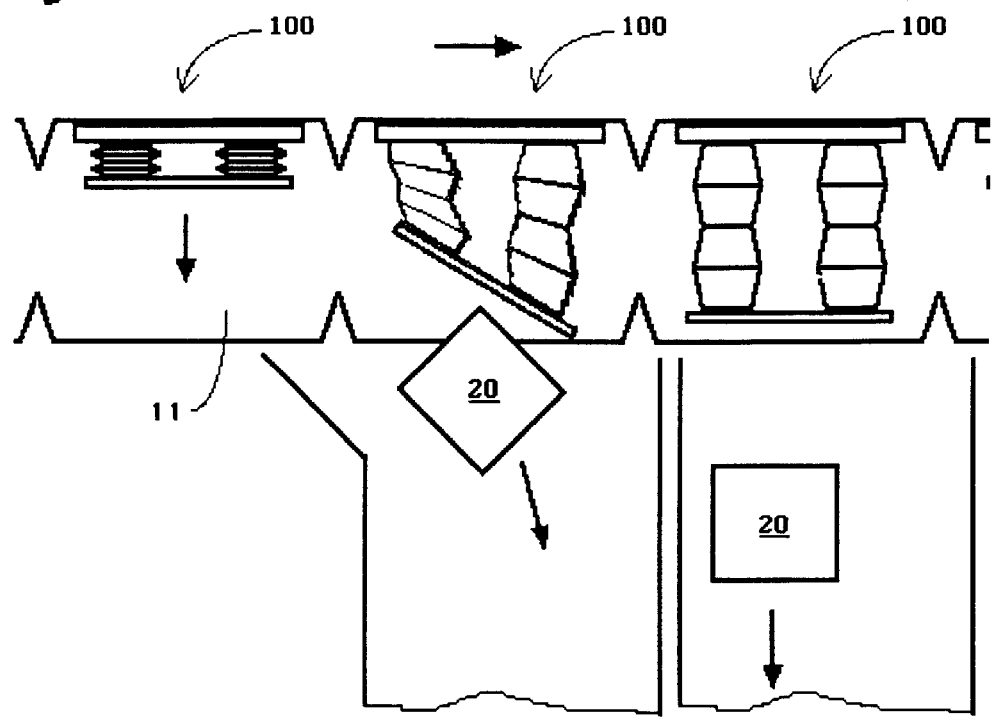
FIG. 11 is a top plan view of an isolated length of a conveyor system according to the present invention, including a "push plate" package conveying segment of FIG. 11, showing different discharge capabilities of a dual-bellows configuration.
Figure 12:
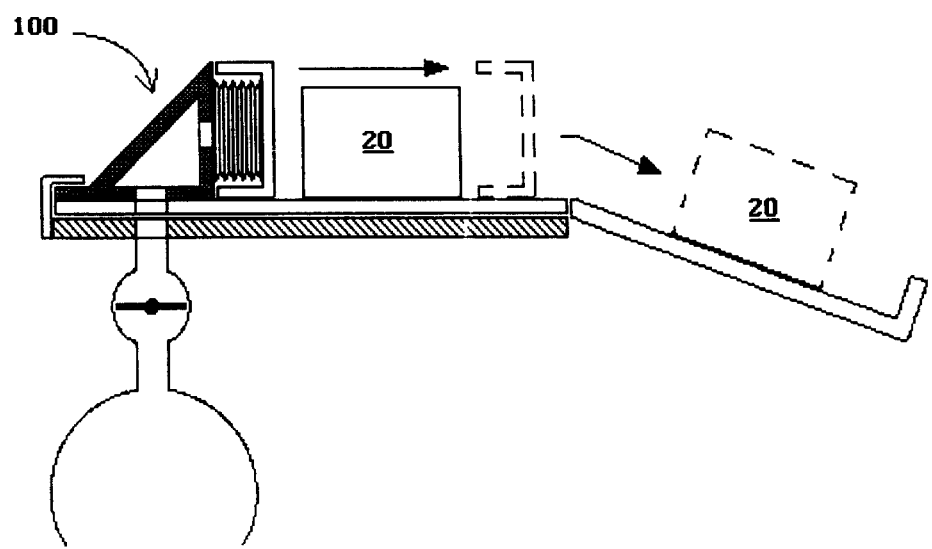
FIG. 12 is a cross sectional view of the configuration shown in FIG. 11, additionally showing an air inlet.

FIG. 11 illustrates the capability of the conveyor according to the present invention to initiate either angled or straight, ("square") discharge, by allowing the bellows to extend in a uniform manner, as in the rightmost segment, or in a non uniform manner, at least through a portion of their stroke, as shown in the middle segment. This could be done by controlling air flow as needed.

Figure 13:
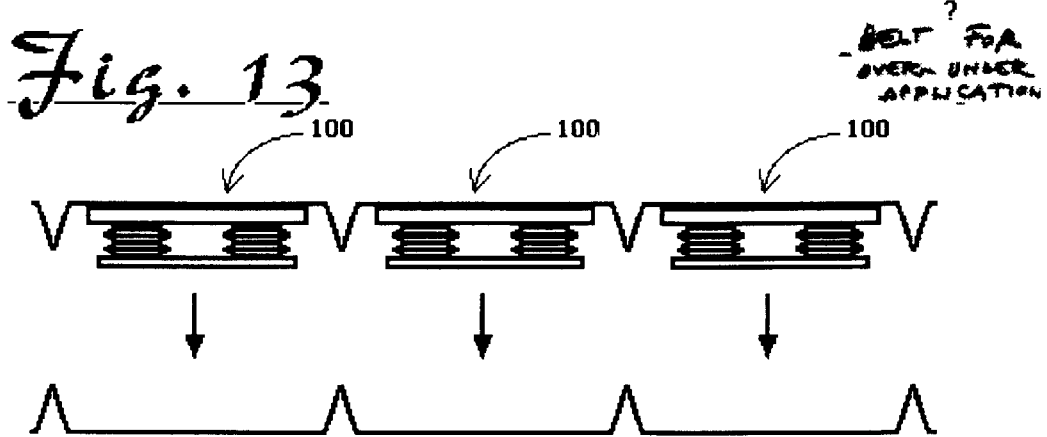
FIG. 13 is a top plan view of a conveyor section including a plurality of push plate conveying segments, such that single side discharge is provided.

FIG. 13 provides single side discharge of the packages. FIG. 15 shows dual-side discharge of the packages.

Figure 14:
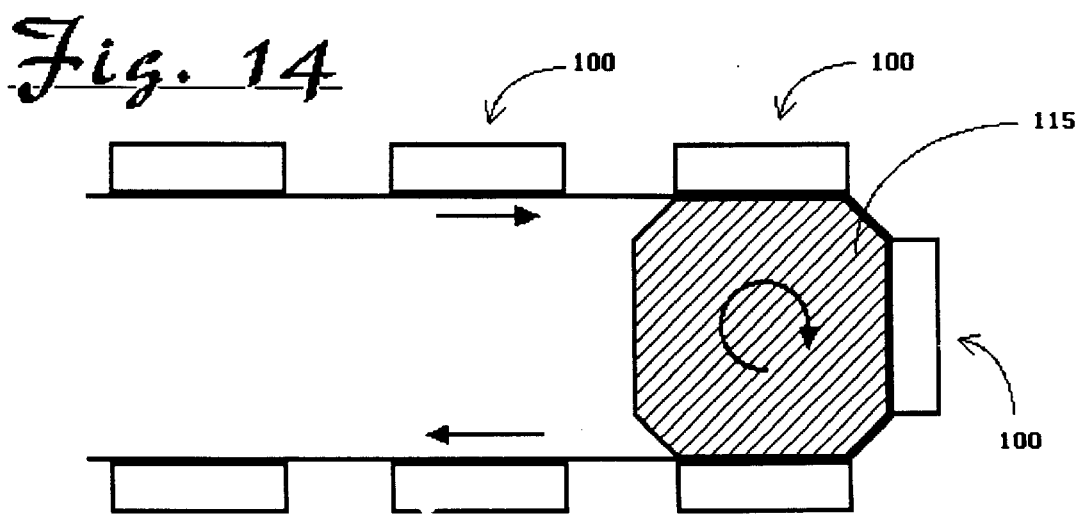
FIG. 14 is a side elevational view of a conveyor system according to the present invention, which includes the use of drum rollers to support the conveyor in the shown "over-under" configuration.

As may be understood, the somewhat rigid form of the air chambers which are attached atop the otherwise flexible package conveying segments 100 of, for example, FIG. 13, could make "over-under" conveyor setups using cylindrical conveyor drive and idler rollers impractical. Therefore, FIG. 14 shows the use of a hexagonally-shaped drive roller 115, which accommodates such over-under configurations.

As may be understood, such an over/under configuration would not have to use the notches as discussed above, instead a conventional, unnotched, conveyor belt could also be used to support assemblies such as 100 thereon.

FIG. 15 shows an alternate configuration which may be used with the present invention. In this configuration, instead of being supported by what is essentially a notched conventional flexible conveyor belt, solid platforms 200 can be used as package supporting segments to support the bellows assemblies and to provide the package supporting surfaces.

Interconnecting the rigid platforms are flexible interconnectors 211, which are essentially rubber interconnectors each of which include two opposing male flanges which fit into female "notches" defined in the edge ends of the platforms and link two adjacent platforms together. The interconnectors can also include an elongate tooth running its length, which can be driven by a slot defined by a drive member such as a roller, such that the platforms are isolated from the drive means by the flexible connectors, while still being driven by the drive means through the connectors. This is suitable for an "over-under" configuration as described above.

FIG. 10 shows an alternate configuration which includes the use of a bellowed air chamber having leading and trailing segments 103A, 103B, respectively, and a hinged pusher plate having leading and trailing segments 101A, 101B, respectively.

As may be understood, one need recognized in the art is to provide a push plate which remains "square" relative to the travel axis of a conveyor path. FIGS. 16A–C illustrate an alternate bellows configuration which includes a "self-correcting" feature. The dual-bellows configuration shown in FIGS. 16A–C provides dual-bellows operation from a single air inlet 206.

In the ejection configuration shown in FIGS. 16A–C, a belt 202 is used to provide a base for the configuration 200, although the present invention contemplates the use of a self-correcting dual bellows ejection configuration on a rigid base. The base 202 includes a vertically-oriented air passageway 206 which is configured to accept air therethrough from an external source such as a valve supply port such as known in the art (not shown).

The air inlet port 206 supplies air to a central air supply tube 205 which is flexible and expandable as discussed in detail below. The central air supply tube provides an air passageway from the air inlet port to a diverter valve assembly comprised of a platelike valve 211 and housing 210. The diverter valve assembly is configured to receive air from the central air supply tube 205, and separate the air flow into two air streams, one into a first, "right" (as viewed in the figures) bellows supply tube 207R and the other air stream to a second "left" bellows supply tube 207L The right and left bellows supply tubes 207R, 207L, respectively, are configured to supply air to right and left air bellows members 204R, 204L. As the right and left bellows members 204R, 204L, are similar in operation and construction, one will be described as an example of the other.

Bellows member 204R has one fixed end terminating at a vertically-oriented plate member 203R, which is substantially rigidly affixed relative to the belt 202. The other end of the bellows member is relatively free to move (due to the flexible nature of the bellows 204R and is attached to one side of a generally vertical pusher plate 201, at one marginal edge of the plate 201. As shown in the drawings, the pusher plate 201 is generally rectangular, and has curved-back vertical edges, but also includes a lower, substantially horizontal, sliding flange 201F (See FIG. 17) which extends from the lower horizontal edge of the push plate. In operation, this sliding flange slides along the upwardly-directed supporting surface of the conveyor belt 202. Also as shown only in FIG. 17, the pusher plate 201 defines a pushing surface 201PS.

Figure 17:
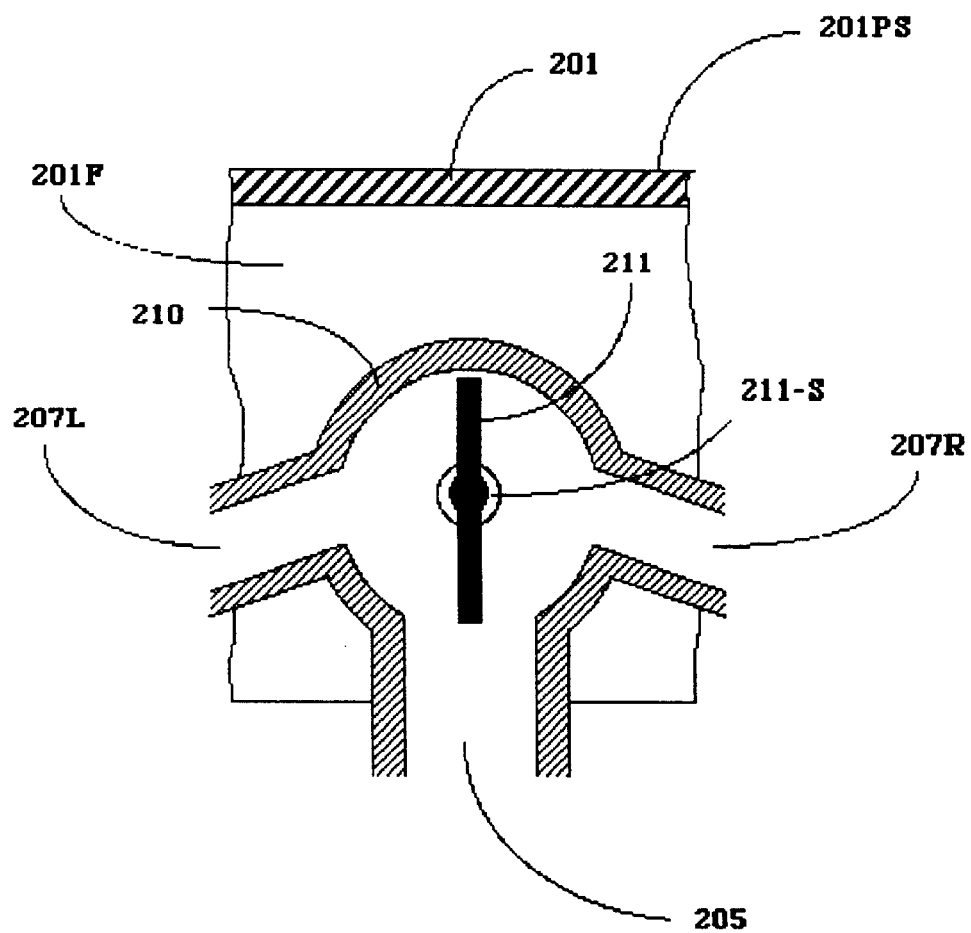
FIG. 17 is a more detailed view of the self-correcting valve of FIGS. 16A–16C.

Reference is now primarily made to FIG. 17. The self-correcting valve assembly includes a housing 210 and a diverting valve 211. The housing 211 has an inlet which communicates with the central supply tube 205, and has substantially opposing outlet ports which supply the aforementioned bellows supply tubes 207R, 207L. The diverting valve 211 is substantially platelike, and is supported (in the preferred embodiment) by the upper end of a support post which extends downwardly from the lower edge of the diverter valve and terminates at and attaches to the upper surface of the sliding flange 201F. The support post extends through a hole in the bottom of the valve housing, and an air seal is provided at 211S between the post and the hole, to accommodate relative movement between the post and the attached diverter plate as discussed below.

The self-correcting valve housing 210 is configured to rotate about the longitudinal axis of the diverter plate support post. This pivoting action provides the self-correcting feature discussed below.

Operation of the self-correcting push plate bellows configuration 200 is now described. Air is introduced into the central air supply hose 205 through the air supply port 206, from an outside source (not shown). Air then passes through the central air supply hose 205, and is diverted to the two bellows supply tubes 207L, 207R, via the self-correcting valve 211.

Air then passes from the supply tubes 207L, 207R, to their respective bellows members 204L, 204R. This causes the bellows members to expand along their longitudinal axes, which are substantially perpendicular to the longitudinal and travel axis of the conveyor. As the bellows members extend, they push the push plate 210 across the conveyor surface with the sliding flange sliding along the upper surface of the conveyor belt and providing some vertical stability thereto.

FIG. 16B illustrates a configuration in which one of the bellows members 204R has become more extended than the other, therefore losing its desired "square" orientation at the beginning of its stroke. This could happen, for example, if a package was not positioned in the center but instead was positioned to one side. Similarly, the valve 211 has also developed an angle with respect to the longitudinal axis of the air supply tube 205. At this time, it is necessary to recall that the self-correcting valve housing 210 can rotate relative to the valve 211. As may be understood, as the bellows members become extended, they likewise extend the central air supply tube 205. This tube 205 is configured to provide some limited resistance to such movement, such that as it is stretched, it undergoes tension which causes a pulling action on the self-correcting valve housing 210 where the tube attaches thereto. This causes the housing to rotate relative to the diverter plate, which, as shown in FIG. 16B, causes the diverter plate to divert a greater proportion of air to the less-extended bellows member 204L. In FIG. 16C, the other bellows member 204L is the more extended member, and as may be seen the diverter plate in this instance is pivoted relative to the housing 210 to cause more air to be diverted through larger gap G to the other bellows member 204R such that preferably the push plate is "corrected" to an orientation such as shown in FIG. 16A.

It should be understood that under this configuration, the tensile force, and thus the twisting feature, is more pronounced at the end of the stroke.

Construction Materials

As noted above, under one embodiment of the present invention, an endless flexible belt composed of (insert belt type) can be used to comprise the conveying segments 11 and the flexible necked portions 14. In fact, under such a configuration the construction could be thought of as a flexible belt which is "notched" along its longitudinal sides to provide the above-referenced flexing features. While on the subject, it should be noted that the flexible nature of such a belt could result in some flexing within the package conveying segments 11 themselves, although it is contemplated that most of the flexing will be in the location between the notches 15.

Conclusion

While this invention has been described in specific detail with reference to the disclosed embodiments, it will be understood that many variations and modifications may be effected within the spirit and scope of the invention as described in the appended claims.

While this present invention in its various aspects has been described in detail with regard to preferred embodiments thereof, it should be understood that variations, modifications and enhancements can be made to the disclosed apparatus and procedures without departing from the spirit and scope of the present invention as defined in the appended claims.

I claim:

1. A self-correcting package diversion apparatus for diverting a package atop a conveying surface and to a location adjacent to the travel path of said conveying surface traveling as it is along a conveying axis, said apparatus comprising:

a conveyor for defining said conveying surface;

a pusher member defining a substantially planar pushing portion;

at least two parallel air bellows members configured to push said pusher member across and relative to said conveying surface upon the filling of said bellows members with air; and a self-correcting valve for controlling the flow of air to said bellows members, said valve configured to supply more air to the bellows which is less extended than the other, such that said substantially planar pushing portion of said pusher member tends to remain substantially parallel to the travel path of said conveying surface.

2. The self-correcting package diversion apparatus as claimed in claim 1, wherein said self-correcting valve includes a single inlet and a pair of outlets corresponding to said pair of air bellows, said self-correcting valve configured to divert more air into the outlet associated with the bellows which is less extended, such that said substantially planar pushing portion of said pusher member tends to remain substantially parallel to the travel path of said conveying surface.

3. The self-correcting package diversion apparatus as claimed in claim 2, wherein said self-correcting valve includes a housing and a diversion flap movable within said housing, the position of said diversion flap within said housing depending upon the angle of said pusher member relative to said conveying axis, said housing having a single inlet and a pair of outlets corresponding to said pair of bellows, said diversion flap configured to divert more air into the outlet associated with the bellows which is less extended, such that said substantially planar pushing portion of said pusher member tends to remain substantially parallel to the travel path of said conveying surface.

4. The self-correcting package diversion apparatus as claimed in claim 1, wherein said valve is configured to tend to cause said planar portion of said pusher member to be substantially normal to the axis of pushing movement.

5. The self-correcting package diversion apparatus as claimed in claim 1, further comprising an air chamber feeding each of said bellows members.

6. The self-correcting package diversion apparatus as claimed in claim 5, wherein said air chamber is attached to said conveyor.

7. The self-correcting package diversion apparatus as claimed in claim 6, wherein said conveyor is a serpentine conveyor.

8. The self-correcting package diversion apparatus as claimed in claim 6, wherein said conveyor is a conveyor comprised of a plurality of substantially rigid members interconnected with flexible interconnecting members, one of said substantially rigid members defining said conveying surface.

9. The self-correcting package diversion apparatus as claimed in claim 1, further comprising a pusher member retraction member for at least assisting in the retraction of said pusher member from an extended to a retracted position.

10. The self-correcting package diversion apparatus as claimed in claim 9, wherein said pusher member retraction member comprises a retracting cable.

11. A self-correcting package diversion apparatus for diverting a package atop a conveying surface and to a location adjacent to the travel path of said conveying surface traveling as it is along a conveying axis, said apparatus comprising:

a conveyor for defining said conveying surface;

a pusher member defining a substantially planar pushing portion;

at least two substantially parallel linear actuator members configured to push said pusher member across and relative to said conveying surface upon the linear actuation and resulting extension of said linear actuation members; and a self-correcting control element for controlling the relative extension of said actuator members, said self-correcting control element configured to recognize which linear actuation member is less extended than the other and to cause said less extended linear actuation member to extend at a greater rate than the other, such that said substantially planar pushing portion of said pusher member tends to remain substantially parallel to the travel path of said conveying surface.

* * * * *